(12) United States Patent
Kil

(10) Patent No.: US 8,004,624 B2
(45) Date of Patent: Aug. 23, 2011

(54) GATE IN PANEL TYPE LIQUID CRYSTAL DISPLAY DEVICE

(75) Inventor: Wang-Seob Kil, Daejeon-si (KR)

(73) Assignee: LG Display Co., Ltd., Seoul (KR)

( * ) Notice: Subject to any disclaimer, the term of this patent is extended or adjusted under 35 U.S.C. 154(b) by 1281 days.

(21) Appl. No.: 11/640,982

(22) Filed: Dec. 19, 2006

(65) Prior Publication Data
US 2008/0012797 A1 Jan. 17, 2008

(30) Foreign Application Priority Data
Jun. 29, 2006 (KR) .................. 10-2006-0059127

(51) Int. Cl.
G02F 1/1333 (2006.01)
G02F 1/1339 (2006.01)
G02F 1/1345 (2006.01)

(52) U.S. Cl. ..................... 349/40; 349/153; 349/151

(58) Field of Classification Search ............. 349/40
See application file for complete search history.

(56) References Cited

U.S. PATENT DOCUMENTS
6,043,971 A * 3/2000 Song et al. ............... 361/111
6,204,895 B1 * 3/2001 Nakamura et al. ........... 349/5

FOREIGN PATENT DOCUMENTS
JP 2007-219525 8/2007
* cited by examiner

Primary Examiner — Wen-Ying P Chen
(74) Attorney, Agent, or Firm — McKenna Long & Aldridge LLP

(57) ABSTRACT

A Gate In Panel (GIP) type liquid crystal display device includes first and second substrates facing each other, an area between the first and second substrates including an active region for displaying images and a dummy region outside of the active region; a common line in a peripheral area of the dummy region of the first substrate; a GIP gate driver on one side of the dummy region of the first substrate; a GIP dummy gate driver in the dummy region between the common line and the GIP gate driver; signal lines that applying signals outputted from a timing controller to the GIP gate driver and the GIP dummy gate driver, the signal lines on the one side of the dummy region on the first substrate; and an electrostatic prevention circuit formed in the dummy region of the first substrate between the common line and the signal lines.

4 Claims, 2 Drawing Sheets

GATE IN PANEL TYPE LIQUID CRYSTAL DISPLAY DEVICE

This application claims the benefit of Korean Patent Application No. P2006-59127, filed on Jun. 29, 2006, which is hereby incorporated by reference for all purposes as if fully set forth herein.

BACKGROUND OF THE INVENTION

1. Field of the Invention

The present invention relates to a Gate In Panel (GIP) type liquid crystal display (LCD) device, and more particularly to an electrostatic protection circuit for signal lines of an LCD device.

2. Discussion of the Related Art

A liquid crystal display (LCD) device uses an electric field to control the light transmittance through liquid crystal having dielectric anisotropy to thereby display images. The typical LCD device includes an LCD panel including a plurality of pixel regions arranged in a matrix configuration, and a driving circuit that drives the LCD panel.

The LCD panel includes first and second substrates bonded to each other with a predetermined interval therebetween, and a liquid crystal layer formed between the first and second substrates. The first substrate includes a plurality of substantially perpendicular gate and data lines that cross to define the pixel regions; a pixel electrode formed in each pixel region; and a thin film transistor formed adjacent to a crossing of the gate and data lines. The thin film transistor is turned-on in response to a scan signal applied sequentially to each gate line to apply a data signal from the data line to the corresponding pixel electrode.

The second substrate includes a black matrix layer that prevents light leakage through portions of the LCD panel other than the pixel region; a color filter layer formed in each pixel region for rendering colors; and a common electrode formed in correspondence with the pixel electrode to drive the liquid crystal layer.

The driving circuit includes a gate driver for driving the gate lines; a data driver for driving the data lines; and a timing controller for supplying a data signal and a control signal to control the gate driver and the data driver.

The gate driver includes a shift register that sequentially outputs a scan pulse to each gate line. The shift register is provided with a plurality of stages connected in sequence. The plurality of stages output the scan pulse sequentially to scan the gate lines of the LCD panel sequence.

In particular, the first stage receives a start pulse from the timing controller as a trigger signal, and each of the other stages receives a signal output from a prior stage as a trigger signal. In other words, at least one of a plurality of clock pulses of differing phase is applied to each stage in sequence. Accordingly, a scan pulse is sequentially output from the first to the last stages.

A gate driver of the related art may be implemented using a gate driver IC including the shift register and connected to a gate line pad of the LCD panel using a tape carrier package (TCP).

The data driver is typically implemented using a data driver IC. However, the gate driver may be implemented using GIP (Gate In Panel) technology in which a shift register is formed on an LCD panel to decrease material costs, manufacturing process steps, and fabrication time.

Hereinafter, a related art GIP type LCD device will be described with reference to FIGS. 1 and 2 of the accompanying drawings.

FIG. 1 is a plan view of a related art GIP type LCD device. FIG. 2 is an expanded plan view of an electrostatic protection circuit of FIG. 1.

In the related art GIP type LCD device, as shown in FIG. 1, a lower substrate 1 is bonded to an upper substrate 2 by a sealant 9 with the lower substrate 1 separated from the upper substrate 2 by a predetermined interval or cell gap. The lower substrate 1 is larger than the upper substrate 2, as the lower substrate 1 includes a non-display area in which a data driver is mounted. The display area of the LCD panel is provided in the region inside the sealant 9 between the bonded the lower and upper substrates 1 and 2. A TCP 7 is mounted in the non-display area of the lower substrate 1. A common line formed on the lower substrate may be electrically connected to a common electrode on the upper substrate via a conductive sealant rather than by using silver (Ag) dots.

The display area of the lower and upper substrates 1 and 2 is divided into an active region (A/A) and a dummy region (D).

The active region (A/A) of the display area on the lower substrate 1 is provided with pixel regions defined by crossings of a plurality of gate lines and a plurality of data lines. Each pixel region includes a pixel electrode and a thin film transistor. Additionally, the active region (A/A) of the display area on the upper substrate 2 is provided with a black matrix layer, a color filter layer, and a common electrode.

The dummy region (D) of the display area on the lower substrate 1 includes a common line (not shown), a GIP gate driver 3, a GIP dummy gate driver 4, and signal lines 5 for applying various signals (clock signal, enable signal, start signal, common voltage, and etc.) output from the timing controller to the GIP gate driver 3 and the GIP dummy gate driver 4. The dummy region (D) of the display area on the upper substrate 2 is provided with a black matrix layer.

A liquid crystal layer is formed in the display area between the lower and upper substrates 1 and 2.

If an electrostatic charge is applied to the signal lines 5 during the manufacturing process, elements of the internal circuitry may damaged. An electrostatic protection circuit is provided with the signal lines 5 to prevent damage to internal circuit elements of the inner circuit from being damaged.

The electrostatic protection circuit 6 will be explained with reference to FIG. 2.

The electrostatic protection circuit 6 is formed in the dummy region at the upper left corner of the LCD panel. The electrostatic protection circuit 6 is formed on a first gate line (for example, the dummy gate line). More particularly, the dummy region includes additional lines 8 corresponding to each signal line connected between the first gate line of the active region and each signal line 5. Electrostatic protection elements 6a corresponding to the number of signal lines are provided in each line 8.

However, the related art GIP type LCD device has the following disadvantages.

In the related art GIP type LCD device, the sealant does not overlap with the electrostatic protection circuit. The electrostatic protection circuit for the signal lines is formed in the dummy region at the upper left side of the LCD panel in which the first gate line is formed. Accordingly, as the electrostatic protection circuit approaches the sealant for bonding the lower and upper substrates, the area available for sealant formation is decreased introducing processing difficulties.

Additionally if the electrostatic protection circuit is formed close to the sealant for bonding the lower and upper substrates and the sealant is formed of the conductive material, the signal lines and the common electrode of the upper substrate may be shorted together.

SUMMARY OF THE INVENTION

Accordingly, the present invention is directed to a gate in panel type liquid crystal display device that substantially obviates one or more problems due to limitations and disadvantages of the related art.

An advantage of the present invention is to provide a GIP type LCD device in which an electrostatic prevention circuit is provided on an LCD panel adjacent to a GIP dummy gate driver to thereby enhance a sealant margin and to improve the yield.

Additional features and advantages of the invention will be set forth in part in the description which follows, and in part will become apparent from the description, or may be learned by practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described herein, a Gate In Panel (GIP) type liquid crystal display (LCD) device includes: first and second substrates facing each other, an area between the first and second substrates including an active region for displaying images and a dummy region outside of the active region; a common line in a peripheral area of the dummy region of the first substrate; a GIP gate driver on one side of the dummy region of the first substrate; a GIP dummy gate driver in the dummy region between the common line and the GIP gate driver; signal lines that apply signals output from a timing controller to the GIP gate driver and the GIP dummy gate driver, the signal lines on the one side of the dummy region on the first substrate; and an electrostatic prevention circuit formed in the dummy region of the first substrate between the common line and the signal lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention.

In the drawings.

DETAILED DESCRIPTION OF THE ILLUSTRATED EMBODIMENTS

Reference will now be made in detail to an embodiment of the present invention, examples of which are illustrated in the accompanying drawings. Wherever possible, the same reference numbers will be used throughout the drawings to refer to the same or like parts.

Hereinafter, an LCD device according to an embodiment of the present invention will be explained with reference to the accompanying drawings.

Figure 1:
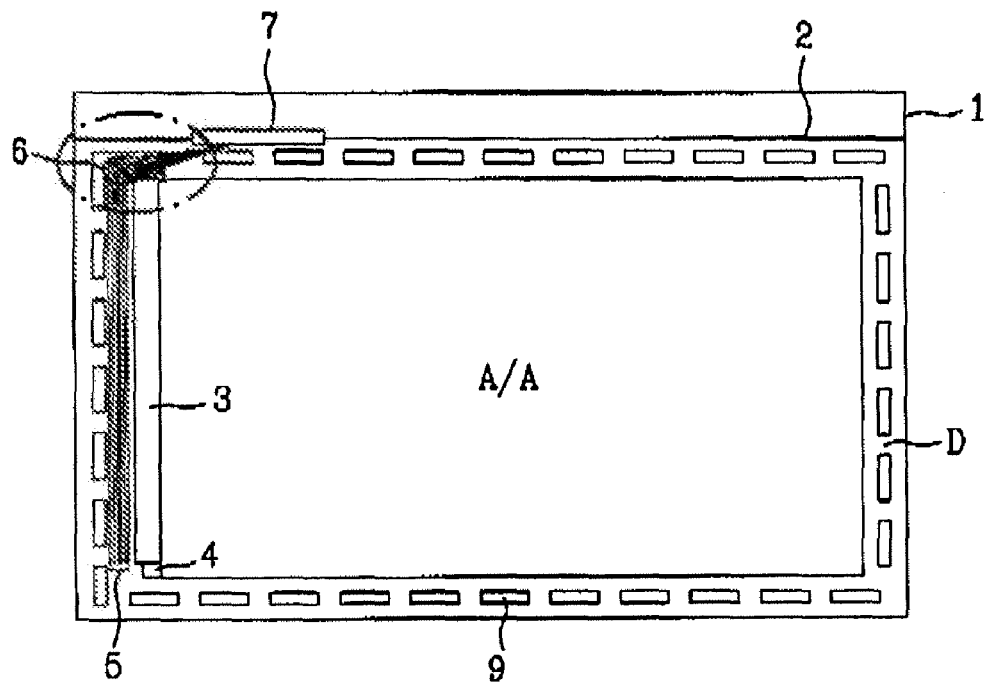
FIG. 1 is a plan view of a related art GIP type LCD device.
Figure 2:
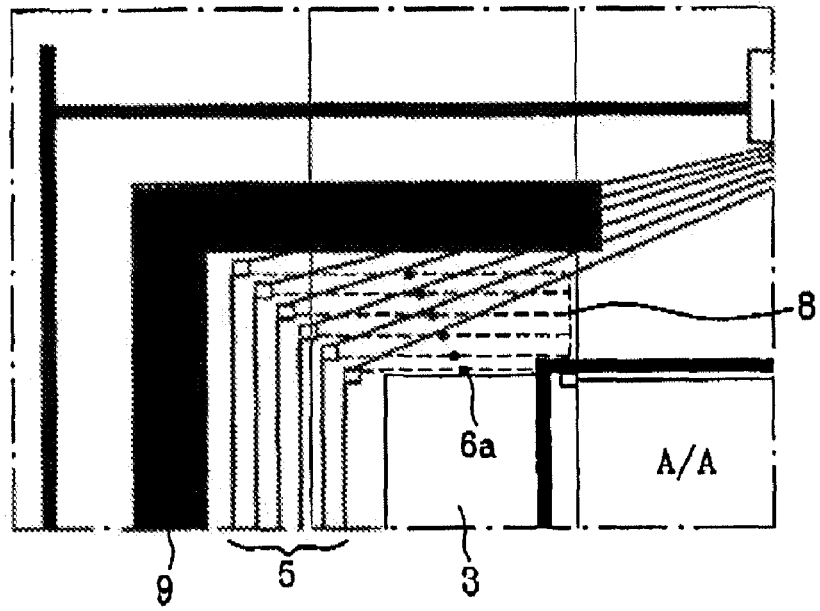
FIG. 2 is an expanded plan view of an electrostatic prevention circuit of FIG. 1.
Figure 3:
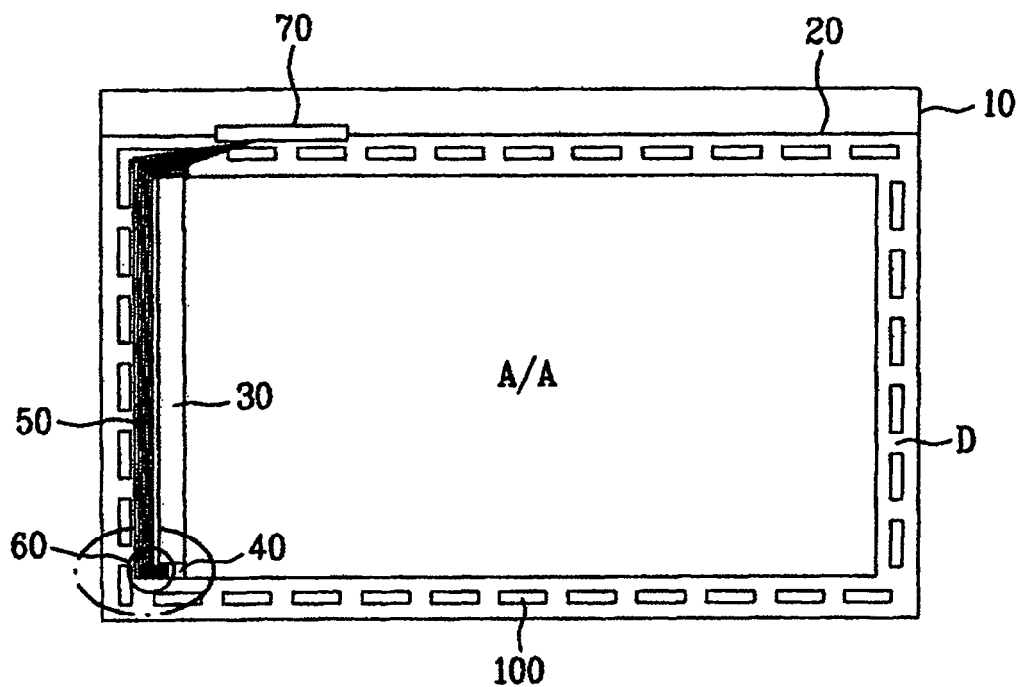
FIG. 3 is a plan view of an LCD device according to the present invention.
Figure 4:
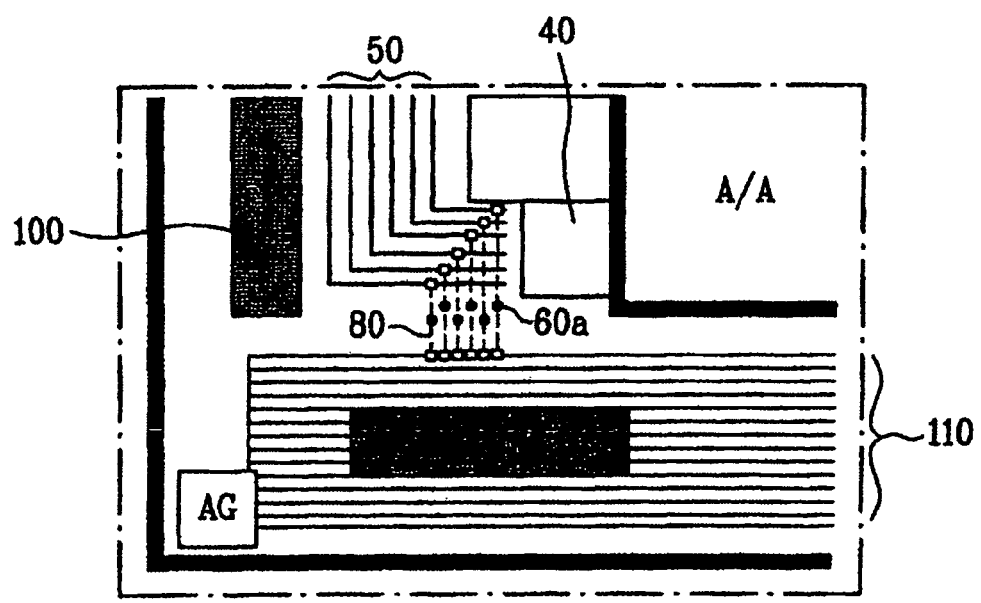
FIG. 4 is an expanded plan view of an electrostatic prevention circuit of FIG. 3 according to the present invention.

FIG. 3 is a plan view of an LCD device according to an embodiment of the present invention. FIG. 4 is an expanded plan view of an electrostatic protection circuit according to an embodiment of the present invention.

As shown in FIG. 3, a GIP type LCD device according to the present invention includes lower and upper substrates 10 and 20 bonded to each other with a predetermined interval therebetween using a sealant 100. The lower substrate 10 is larger than the upper substrate 20 as the lower substrate 10 includes a non-display area in which a data driver is mounted. A display area is provided in the region inside the sealant 100 and between the bonded lower and upper substrates 10 and 20. As shown in FIG. 3, a TCP 70 is mounted in the non-display area of the lower substrate 10.

The display area of the lower and upper substrates 10 and 20 is divided into an active region (A/A) and a dummy region (D).

The active region (A/A) of the display area on the lower substrate 10 includes pixel regions including a gate line, a data line, a pixel electrode, and a thin film transistor. The upper substrate 20 includes a black matrix layer, a color filter layer, and a common electrode within the active region (A/A) of the display area.

The dummy region (D) of the display area on the lower substrate 10 includes a common line 110, a GIP gate driver 30, a GIP dummy gate driver 40 to output a signal to a dummy gate line, and signal lines 50 for applying various signals (clock signal, enable signal, start signal, common voltage, and etc.) output from a timing controller to the GIP gate driver 30 and the GIP dummy gate driver 40. The dummy region (D) of the display area on the upper substrate 20 is provided with a black matrix layer.

The common line 110 is formed on the lower side of the dummy region of the LCD panel. The sealant 100 is provided above and overlapped with the common line 110. To allow hardening the sealant 100 by applying the light to the sealant 100, the common line 110 includes a plurality of separate, electrically connected lines. In addition, because the GIP dummy gate driver 40 is smaller in size than the GIP gate driver 30 the area of the dummy region corresponding to the GIP dummy gate driver 40 may be larger than the area corresponding to the GIP gate driver at the left upper side of the LCD panel.

A liquid crystal layer is formed in the display area between the lower and upper substrates 10 and 20.

In order to prevent the elements of inner circuit from being damaged by electrostatic charges applied to the signal lines 50 during processing, an electrostatic protection circuit 60 is provided for the signal lines 50.

The electrostatic protection circuit 60 will be explained with reference to FIG. 4.

As shown in FIG. 4, the electrostatic protection circuit 60 is formed in the dummy region corresponding to the left lower side of the LCD panel. The electrode prevention circuit 60 is formed on the common line 110.

That is, an additional line 80 corresponding to each signal line is provided in the dummy region and connected between the common line 110 and each signal line 50. Electrostatic protection elements 60a corresponding to the number of signal lines 50 are provided in each line 80.

The GIP dummy gate driver 40 is formed in the lower side of the GIP gate driver 30 and the electrostatic protection circuit 60 is provided in the dummy region between the common line 110 and the signal lines 50 provided at or adjacent to one side of the GIP dummy gate driver 40.

As mentioned above, the GIP type LCD device according to the present invention may have the following advantages.

In the GIP type LCD device according to an embodiment of the present invention, the electrostatic protection circuit of the signal lines is provided in the left lower side of the LCD panel, which is larger than the dummy region corresponding to the left upper side of the LCD panel. Thus, it is possible to increase the interval between the electrostatic protection circuit and the sealant for bonding the lower and upper substrates, to thereby obtain sufficient margin for the formation of the sealant.

As the electrostatic protection circuit is separated by a predetermined interval from the sealant for bonding the lower and upper substrates, it is possible to prevent the signal lines and the common electrode of the upper substrate from being shorted even if the sealant is formed of the conductive material, thereby enhancing the manufacturing yield.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A Gate In Panel (GIP) type liquid crystal display (LCD) device, comprising:
    first and second substrates facing each other, an area between the first and second substrates including an active region for displaying images and a dummy region outside of the active region;
    a common line in a peripheral area of the dummy region of the first substrate, the common line including a plurality of conductive lines;
    a GIP gate driver on one side of the dummy region of the first substrate;
    a GIP dummy gate driver in the dummy region between the common line and the GIP gate driver;
    signal lines on the first substrate, wherein the signal lines apply signals output from a timing controller to the GIP gate driver and the GIP dummy gate driver, the signal lines on the one side of the dummy region on the first substrate;
    an electrostatic prevention circuit formed in the dummy region of the first substrate between the common line and the signal lines,
    a sealant that bonds the first substrate to the second substrate on conductive lines of the common line.

2. The GIP type LCD device of claim 1, wherein the electrostatic prevention circuit is on the one side of the dummy region and adjacent to the dummy gate driver.

3. The GIP type LCD device of claim 1, wherein the electrostatic prevention circuit includes:
    electrostatic prevention elements corresponding to each of the signal lines; and
    a plurality of lines connecting each of the electrostatic prevention elements to the corresponding signal line and to the common line.

4. The GIP type LCD device of claim 1, wherein the sealant includes a conductive material.

* * * * *